(No Model.)
2 Sheets—Sheet 1.
A. L. RICH.
HOT WATER LOCOMOTIVE FOR TRAMWAYS.
No. 417,505.　　　　　　　　Patented Dec. 17, 1889.
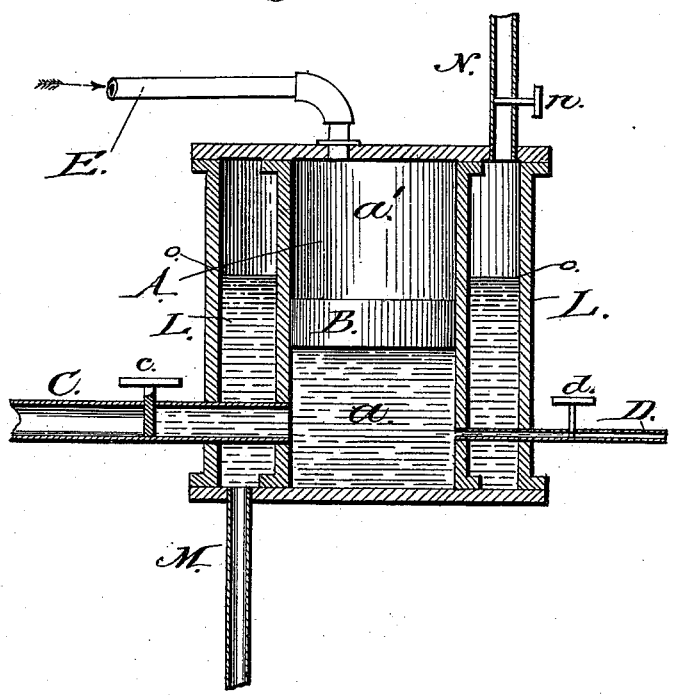
WITNESSES
INVENTOR (No Model.) 2 Sheets—Sheet 2.
A. L. RICH.
HOT WATER LOCOMOTIVE FOR TRAMWAYS.
No. 417,505. Patented Dec. 17, 1889.
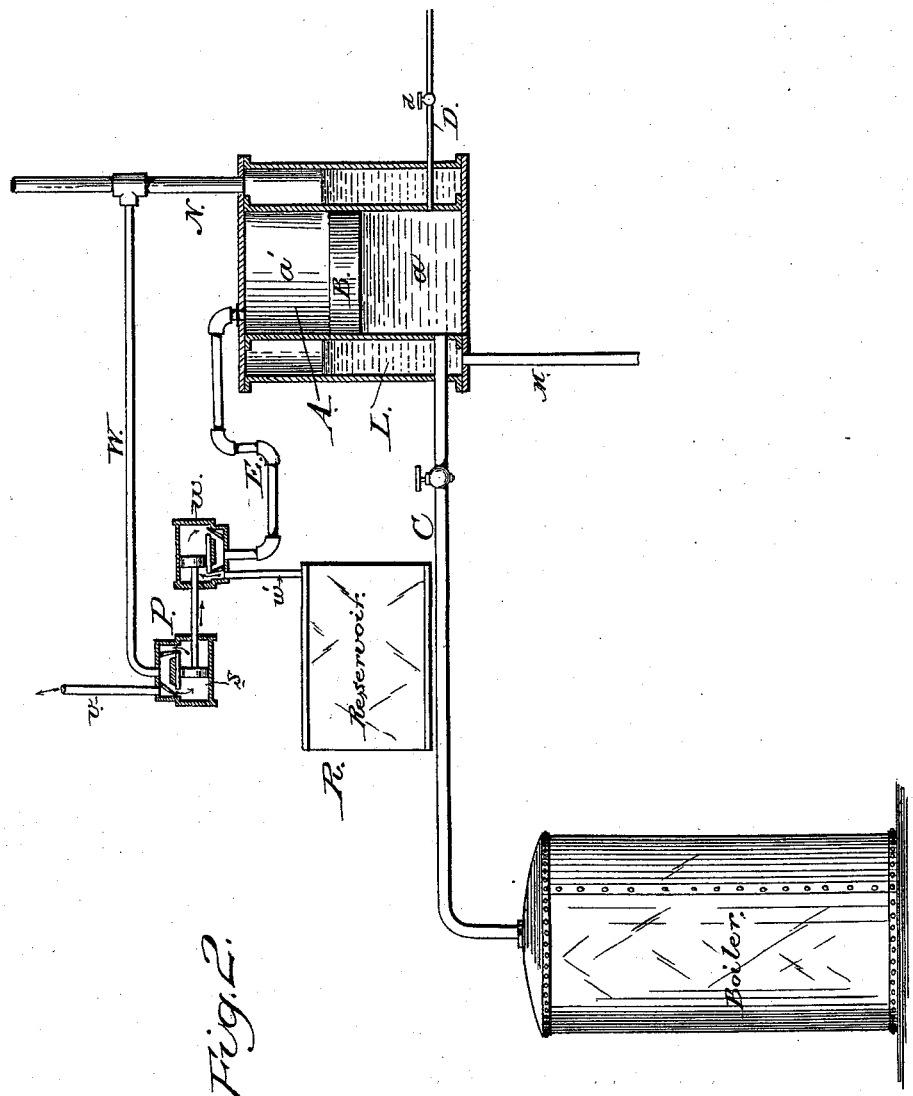
WITNESSES
T. W. Fowler
W. H. Patterson
INVENTOR
Abraham L. Rich
by A. H. Evans & Co
Attorneys ered by a vessel or boiler L. The accumulators may be of any desired dimensions—say thirty inches long by fifteen inches in diameter. Inside of this cylindrical accumulator I place a piston B. To the foot end *a* of the accumulator I connect an inlet-pipe C, provided with a valve *c*, and also an outlet-pipe D, having a valve *d*. To the head end *a'*, I connect an inlet-pipe E.
UNITED STATES PATENT OFFICE.

ABRAHAM LINCOLN RICH, OF ALLEGHENY, PENNSYLVANIA.

HOT-WATER LOCOMOTIVE FOR TRAMWAYS.

SPECIFICATION forming part of Letters Patent No. 417,505, dated December 17, 1889.

Application filed April 26, 1888. Serial No. 271,976. (No model.)

*To all whom it may concern:*

Be it known that I, ABRAHAM LINCOLN RICH, a citizen of the United States, residing at Allegheny, in the State of Pennsylvania, have invented certain new and useful Improvements in Hot-Water Locomotives for Tramways, of which the following is a clear, full, and exact description, reference being had to the accompanying drawings, making a part of this specification, in which—

Figure 1 is a sectional view illustrating the application of my method. Fig. 2 is a similar view showing the pump-reservoir and steam-boiler and their connections.

My invention consists in a method of governing the discharge of stored energy, impregnating a fluid in a containing-vessel or accumulator, otherwise known as "hot-water motors," and designed to furnish power from the energy in storage, under pressure, to operate street-cars and other vehicles, and thereby be enabled to work the fluid with greater efficiency and accomplish the work without presenting the objectionable characteristics—such as smoke and noise—incident to the operation of continuous-fired boilers.

The stored energy is discharged evaporatively and radiantly—evaporatively by permitting the energized fluid to escape through a pipe having a valve, said valve providing a small orifice through which the energized fluid discharges, evaporating into a steam-chest or similar vessel, where the atoms of the energized fluid expand into a vapor, othwise a working fluid-pressure or steam, which can then be utilized. The discharge can be made to occur radiantly by surrounding the accumulator with another vessel or boiler, into which there is pumped water at normal temperature. The energy impregnating the fluid in the accumulator escaping radiantly through the sides thereof is absorbed by this fluid in the surrounding vessel or boiler, thereby becoming energized, and the energy escaping from this fluid causes a part thereof to evaporate, forming a vapor or steam, which can be utilized in the usual way. The most efficient results are secured when the discharge is effected by both methods at the same time. As hitherto worked the pressure or tension of the fluid is simply that which it would naturally attain, due only to the degree of energization existing therein. Consequently as the discharge of energy proceeds the fluid contracts, the pressure or tension declines, and likewise the tendency of the energy to discharge is reduced, resulting in a decreased potential. Therefore the power obtainable gradually grows less and finally becomes insufficient to perform work, although a large amount of energy may remain in storage; and in utilizing the energy there is obtained but a comparatively low efficiency, because no fluid, by reason of its energization, dilates sufficiently to attain a pressure high enough to enable more than a comparatively small amount of the energy existing therein to be recovered by its expansion.

Now, I propose to subject the energized fluid, when shut off from the source of supply, to an artificial pressure—that is to say, to a pressure which would be other than, independent of, or in addition to the pressure which it would naturally attain due only to the degree of energization existing therein, and thereby be enabled to effect the discharge of a greater proportion of the energy in storage, and at a desired or uniform rate, also secure a greater efficiency in utilizing the energy.

Referring to the drawings, A represents a cylindrical accumulator or storage-reservoir surrounded by a vessel or boiler L. The accumulators may be of any desired dimensions—say thirty inches long by fifteen inches in diameter. Inside of this cylindrical accumulator I place a piston B. To the foot end *a* of the accumulator I connect an inlet-pipe C, provided with a valve *c*, and also an outlet-pipe D, having a valve *d*. To the head end *a'*, I connect an inlet-pipe E.

The pipes C and D above mentioned pass through and outside of the surrounding vessel or boiler L, which is also provided with an inlet-pipe M and an outlet-pipe N, having a valve *n*.

The process of charging can be accomplished substantially as follows—viz., connect pipe C with a stationary steam-boiler or other source of supply and draw therefrom an amount of energized fluid (in the liquid state) sufficient to fill the foot end *a* of the accumulator; or water at normal temperature could first be introduced into the foot end *a* of the accumulator and become energized to the degree of energization existing in the boiler. If it be desirable to energize the fluid in the accumulator to a higher degree than that existing in the stationary steam-boiler, steam can be pumped in until the desired degree of energization be attained. The process of charging having been accomplished, the fluid in the foot end $a$ of the accumulator is then shut off from the source of supply. Suppose that the stationary boiler is being worked at a pressure of one hundred pounds per square inch, the fluid in the accumulator would consequently be energized to same degree. This pressure of one hundred pounds per square inch is the pressure which the fluid naturally attains due only to the degree of energization—viz., 328° Fahrenheit. Now, inject or pump water into the head end $a'$ of the accumulator until it causes the piston B to bear against the fluid in the foot end $a$ of the accumulator with sufficient force to produce any desired pressure therein—say three hundred pounds or more to the square inch. Thus the pressure would be increased, but the degree of energization would remain as before—viz., 328° Fahrenheit. The pressure is therefore an artificial pressure, a pressure other than, independent of, or in addition to the pressure which it would naturally attain due only to the degree of energization. Into the surrounding vessel or boiler L there is introduced an amount of water sufficient to enable it to attain a desired level, as shown at O O. The valve $d$ is now opened the proper distance, enabling the energized fluid to escape through pipe D, whence it evaporates into a steam-chest or similar vessel, the atoms of the fluid expanding into the vaporous state, constituting a working fluid-pressure or steam. At the same time the energy is also escaping radiantly through the sides of the accumulator and absorbed by the water in the surrounding vessel or boiler L, and escaping from the surface thereof it carries with it a portion of the fluid in the vaporous state, constituting a working fluid-pressure or steam, which can be led off through pipe N at a desired pressure and utilized. Now, the discharge taking place radiantly through the sides of the accumulator results in a contraction of the energized fluid, and the evaporative discharge through pipe D reduces the amount thereof in the accumulator, consequently the pressure or tension of the fluid would decline and necessarily result in a decreased tendency to discharge, both evaporatively and radiantly, unless the space in which it is confined be also reduced in volume. I accomplish this latter reduction of volume by forcing additional water through the pipe E into the head end $a'$ of the accumulator, thereby causing the piston B to bear against the energized fluid in the foot end $a$ of the accumulator, thereby compensating for the loss of energy. It is evident that this compensating action may be accomplished automatically by a pump deriving power by utilizing therefor a portion of the energy in storage.

In practice it may be desirable to have the pressure automatically increase as the degree of energization of the fluid decreases; also to decrease the opening of the discharge-valve $d$, that the amount of fluid escaping shall not become in excess of the energy discharged. Thus the energized fluid contained in the accumulator can be subjected to an artificial pressure, a pressure other than, independent of, or in addition to the pressure which it would naturally attain due only to the degree of energization, thereby securing the discharge of a greater proportion of the energy in storage and at a desired or uniform rate, also enabling the energized fluid to be expanded through a greater range of pressure, thereby recovering a larger proportion of the energy in doing useful work, and thus securing an increased efficiency in working the fluid.

Having thus fully explained my invention, what I claim as new, and desire to secure by Letters Patent, is—

The method herein described of governing the discharge of stored energy, impregnating a fluid in a containing-vessel and shut off from the source of supply, the same consisting in subjecting the energized fluid to an artificial pressure, a pressure other than, independent of, or in addition to the pressure which it would naturally attain due only to the degree of energization, whereby the requisite tendency or inclination of the energy with which the fluid is impregnated to discharge may be maintained, and the energy thereby be discharged at a desired or uniform rate and with greater efficiency, substantially as herein set forth.

ABRAHAM LINCOLN RICH.

Witnesses:
  THOS. WELSH,
  J. A. McGRAW.